United States Patent [19]

Pilc et al.

[11] 3,761,894

[45] Sept. 25, 1973

[54] PARTITIONED RAMDOM ACCESS MEMORIES FOR INCREASING THROUGHPUT RATE

[75] Inventors: Randolph John Pilc, Holmdel; Gabriel Gary Schlanger, West Orange, both of N.J.

[73] Assignee: Bell Telephone Laboratories, Incorporated, Murray Hill, N.J.

[22] Filed: May 12, 1972

[21] Appl. No.: 252,848

[52] U.S. Cl. .......................... 340/172.5, 179/15 AQ

[51] Int. Cl. .......................... H04j 3/00

[58] Field of Search .......................... 340/172.5; 179/15 AQ, 186 F

[56] References Cited

UNITED STATES PATENTS

| | | | |
|---|---|---|---|
| 3,649,763 | 3/1972 | Thompson | 179/15 AQ |
| 3,676,855 | 7/1972 | Tallegas | 340/172.5 |
| 3,632,883 | 1/1972 | Aagaard | 179/15 AQ |
| 3,263,030 | 7/1966 | Stiefel et al. | 179/15 AQ |
| 3,458,659 | 7/1969 | Sternung | 179/15 AQ |
| 3,629,846 | 12/1971 | Thompson | 340/172.5 |
| 3,638,193 | 1/1972 | Opferman et al. | 340/172.5 |
| 3,678,205 | 7/1972 | Cohen et al. | 179/15 AQ |
| 3,697,959 | 10/1972 | Abramson et al. | 340/172.5 |
| 3,701,112 | 10/1972 | Hagelbarger | 340/172.5 |

*Primary Examiner*—Paul J. Henon
*Assistant Examiner*—Melvin B. Chapnick
*Attorney*—W. L. Keefauver et al.

[57] ABSTRACT

Multiplexed words on the data bus of a time-division switch are written into a random access memory system and thereafter distributed to predefined time slots on selected lines. To increase the throughput of the memory system, two sets of memories are assigned to each line, each memory having a storage area dedicated to each of the several time slots on the line. During each time-division frame consecutive ones of the data words on the bus are each written into an appropriate one of the storage areas in consecutive ones of the memories in one set. At the same time data is read out from the memories in the other set into the time slots on the line, all of the storage areas dedicated to a time slot being read out simultaneously.

8 Claims, 7 Drawing Figures

PARTITIONED RAMDOM ACCESS MEMORIES FOR INCREASING THROUGHPUT RATE

FIELD OF THE INVENTION

This invention relates to random access memory systems and, more particularly, to a memory system which may advantageously be utilized to temporarily store data signals being interchanged between a high-speed data bus in a time-division multiplex data transmission system and a plurality of relatively low-speed time-division communication lines.

DESCRIPTION OF THE PRIOR ART

In known forms of communication systems, a transmission path or line may accomodate a plurality of signaling channels on a time-division multiplex basis. In these systems, each channel is assigned a time slot in a cycle or frame which is regularly repeated. Each time slot provides an interval during which the transmission path carries data defining a sample or samples of the message signal from the channel source.

Switching systems for interconnecting channels on various common transmission paths must have the capability of interconnecting an incoming channel in any time slot on any one path with an outgoing channel in any time slot on any other path. More specifically, the switch must provide both time switching (time slot interchange) and space switching (line interconnection). The time switching interchanges the data in time from the time slot assigned to the incoming channel to the time slot assigned to the outgoing channel. The space switching transfers the data from the incoming transmission path to the outgoing path.

When large pluralities of lines are interconnected, it is desirable, from an economic point of view, to employ a common switch. To this end, a preferred system organization is arranged to multiplex all the channels from all the incoming transmission paths onto a common data bus to create a superframe of data wherein each time slot in the superframe is assigned to a specific incoming channel on one of the incoming paths. A time-division switch then provides the appropriate time and space switching to distribute the data from each time slot on the data bus to the desired time slot on the desired outgoing path.

A preferred structure of the time-division switch involves a register or store for each outgoing path, each store having storage areas individually dedicated to each outgoing channel and thus to each time slot on the outgoing path. Space switching is accomplished (under control of an address processor) by transferring data from each time slot on the common data bus to the storage area in the outgoing path store dedicated to the outgoing channel. The stored data is then read out of the storage area to the outgoing path within the time slot assigned to the outgoing channel to achieve the time switching.

It is to be noted that data from the bus is transferred to outgoing path stores in a random sequence; data in two or more successive bus time slots may be transferred to outgoing channels in the same outgoing path. Access to each outgoing path store to write in the data must therefore be at the high bus signaling rate, although the read-out access need be only at the relatively low outgoing path signaling rate.

A known form of storage, preferable for its low power consumption and reasonable cost is the random access memory. These advantages are diminished, however, when high access rates are required. To retain the advantages, it has been suggested that the data be distributed among a plurality of low access rate random access memories whereby the access rate of the memory system exceeds the access rate of any individual memory in the system. The prior multiple memory systems, however, are limited to systems having the same write-in and read-out access rates. It is therefore an object of this invention to provide a memory system having a high access rate during one cycle, such as the write-in cycle, and a relatively low access rate during the other cycle, such as the read-out cycle.

SUMMARY OF THE INVENTION

In accordance with the principal object of this invention, a set of random access memories is provided for each outgoing path, each memory having a storage area dedicated to each of the channels on the path. During a frame interval, data assigned to the several outgoing channels in an outgoing path is distributed to the various memories in the set associated with the path; data assigned to a particular one of the outgoing channels is written into the dedicated storage area in one of the memories. During the next sequential frame, the stored data is read out to each channel; all of the storage areas in the several memories dedicated to a channel are read out simultaneously (since data is stored in only one storage area). Since storage areas are simultaneously read out, all the areas can be accessed at the lower outgoing path signaling rate.

In the illustrative embodiment disclosed herein, each outgoing path is provided with two memory sets. During any frame, data from the data bus is written into one set of memories and stored data is read out from the other set to the associated outgoing path. During the next sequential frame, the bus data is written into the other set while the data stored in the first set is read out to the channels. In addition, during the write-in cycle of each set, successive ones of the memories in the set are designated to store data from successive ones of the time slots of the data bus (in the event that the data is destined for channels in the outgoing path). The identification (by the address processor) of an outgoing channel on the associated outgoing path as the destination of the data in the bus time slot, together with the designation of the successive one of the stores selects the storage area in the designated store dedicated to the outgoing channel. The selected storage area is thereupon accessed and the data on the bus is stored therein.

The foregoing and other objects and features of this invention will be more fully understood from the following description of an illustrative embodiment thereof taken in conjunction with the accompanying drawings.

DETAILED DESCRIPTION

Figure 1:
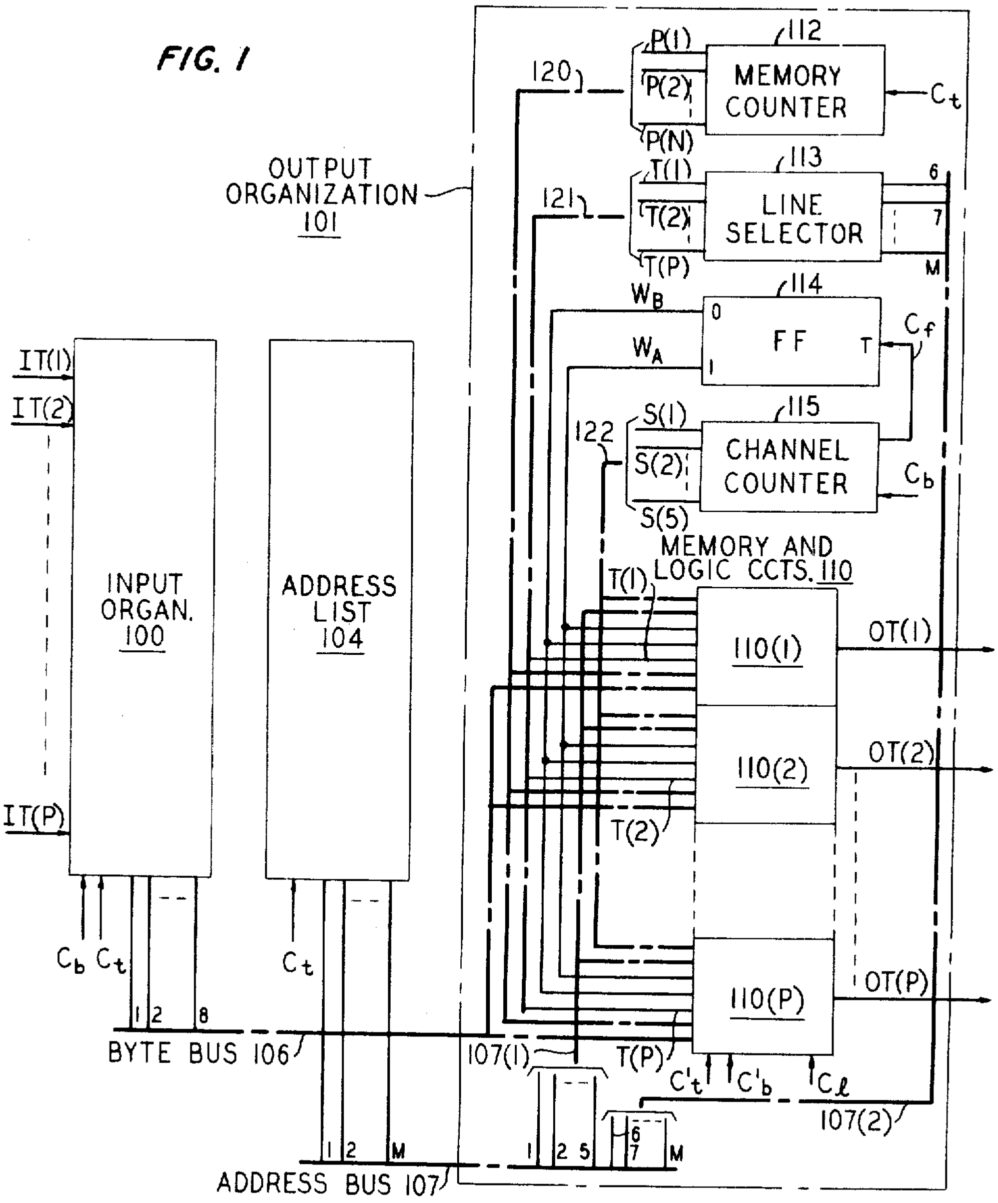
FIG. 1 shows, in block form, the organization of the circuitry and equipment which forms a time-division multiplex data transmission system utilizing a random access memory system in accordance with this invention.

The time-division switch, as shown in FIG. 1, may be considered as divided into three general portions; namely, input organization 100, address list 104 and output organization 101.

In FIG. 1 there is shown a plurality of incoming lines or trunks, P in number. The lines, identified as incoming lines IT(1) through IT(P), are shown connected to input organization 100. In the specific embodiment described herein there are provided an indentical number of outgoing lines or trunks connected to output organization 101 and identified as outgoing lines OT(1) through OT(P). Each line is arranged to be a data trunk accommodating a plurality of data channels on a time-division basis. For the purpose of this description, each line accomodates 24 data channels.

The specific type of signaling format for each data channel comprises serial data bits which are organized in groups of eight bits, each group hereinafter called a "byte." An incoming serial data stream is received over each incoming line, each data stream comprising sequential frames of data, each frame of data comprising 24 bytes which are sequentially derived from the 24 channels. Accordingly, a frame of data on any incoming line comprises a serial train of 24 interleaved bytes, one byte from each data channel.

Each of the outgoing lines accomodates substantially the same data stream format as an incoming line; that is, each outgoing line is a time-division data trunk accomodating 24 channels and carrying a frame of 24 eight-bit bytes. The time-division switch transfers data from the channels on the incoming lines to channels on the outgoing lines. As described hereinafter, the switch provides both time and space switching; that is, it has the capability of transferring data from any channel on any incoming line to any channel on any outgoing line.

In the present arrangement the line speeds of the incoming and outgoing lines are identical. Since the data formats of the lines are the same, the durations of the bits, of the bytes, and of the frames on all of the lines are correspondingly the same. Since we have fixed the number of incoming lines at P, the total number of incoming bytes from all lines for any frame interval is 24P bytes. During the same frame interval the time-division switch passes to each of the outgoing lines the same number of bytes as the switch receives from any incoming line; namely 24 bytes.

Input organization 100 accepts the serial data from each incoming line and assembles them in a parallel byte format. More specifically, the eight bits of each incoming byte are assembled in parallel in a line unit, not shown. These eight parallel-bit bytes are then inserted in a shift register arrangement, not shown, under the control of a clock pulse, identified as clock pulse $C_b$ and shown as waveform $C_b$ in FIG. 7. The duration of a cycle of clock pulse $C_b$ is the same as each byte duration, and each leading edge of clock pulse $C_b$, such as edges 701 or 702, clocks the bytes assembled in parallel in all line units into the several stages of the shift register.

The bits of each byte are now shifted out in parallel to byte bus 106, which comprises eight parallel leads. The shift pulses are provided by a clock source, identified as clock pulse $C_t$ and shown as waveform $C_t$ in FIG. 7. There are P clock pulses of clock $C_t$ between successive leading edges of clock pulse $C_b$. Thus, all the bytes from the severa' incoming lines are inserted, in parallel, into the shift register by clock pulse $C_b$ and are then shifted onto byte bus 106 by clock pulse $C_t$. Byte bus 106 therefore has impressed thereon P interleaved bytes of parallel bits during each byte interval. This creates P time slots, the cumulative duration of the P time slots being equal to or less than a byte interval; that is, the duration of time required by any line to receive the eight bits of one byte.

This process is repeated for each successive incoming byte interval. Thus, for each line frame interval, the bytes from all the channels on all the lines are received, assembled and applied, in interleaved fashion, to the byte bus. The information on byte bus 106, therefore, comprises a superframe of data which comprises 24 byte intervals. An exemplary input organization for receiving data from a plurality of time-division data trunks, for assembling the data and applying it, in interleaved fashion, to a byte bus is disclosed in the copending application of T. H. Gordon-P.J. Marino- R. J. Pilc, Ser. No. 128,767, filed Mar. 29, 1971.

We have assumed that there are P time slots on byte bus 106 for each byte interval. A superframe of data consists of 24 byte intervals, or 24P time slots. We have also assumed that each incoming line accommodates the same number of channels; namely, 24. Thus, it can be said that during any byte interval, one time slot on byte bus 106 is assigned to each line and, therefore, assigned to a specific data channel on the line. Accordingly, if one identifies a time slot, he can also identify the specific data channel from whence the byte, occupying the time slot, was received.

Byte bus 106 extends to output organization 101. As described hereinafter, output organization 101 has the capability of accepting the data on byte bus 106 and applying the data to the appropriate channel on the appropriate outgoing line. More specifically, and as described in detail hereinafter, output organization 101 directs the data on byte bus 106 to portions or addresses in random access memories as defined by address information received over address bus 107 and thereafter distributes the stored data to the various outgoing lines in accordance with an internal logic program.

Address bus 107 consists of M parallel leads. Information on address bus 107 is provided by address list 104. Address list 104 is organized to apply an address work comprising M parallel bits to address bus 107 during each time slot on byte bus 106. The number of bits (M) in the address word is sufficient to enable the address word to identify all of the 24P outgoing channels. Since each address work appears on address bus 107 in a time slot which coincides in time with the time slot that a byte appears on bus 106, the address word is dedicated to the incoming channel from whence the byte is provided and directs the byte to the appropriate outgoing channel. Summarizing, each address word is dedicated to an incoming channel; is applied to address bus 107 in a time slot coinciding in time with the time a byte derived from the incoming channel is applied to byte bus 106; and defines the outgoing channel to which the byte is to be transferred. An exemplary address list for providing the functions defined above is disclosed in the copending application of T. H. Gordon et al, referred to above.

Summarizing the operation of the time-division switch, incoming bytes from data channels on the several incoming time-division lines are assembled, in parallel, by input organization 100 and passed to byte bus 106 in time slots dedicated to the data channels. As each byte appears on byte bus 106, a corresponding address word (also dedicated to the incoming channel) is applied to address bus 107 by address list 104. The address word, which defines the outgoing channel, together with the byte, is applied to output organization 101. Output organization 101, which includes a plurality of random access memories, is controlled by the address word to insert the incoming byte in an appropriate storage position of a memory. Output organization 101 then reads out the various stores and applies the data stored therein to appropriate channels in the outgoing lines.

Output organization 101 includes P memory and logic circuits, generally identified as memory and logic circuits 110(1) through 110(P). Each of the memory and logic circuits terminates one of the outgoing lines and each of these latter circuits is substantially identical and functions to first store data bytes from bus 106 and thereafter pass the byte to an appropriate channel in the corresponding outgoing line.

As described in detail hereinafter, each of memory and logic circuits 110(1) through 110(P) includes two sets of random access memories, each set comprising N memories. The byte on byte bus 106 is directed by the address word to the memory and logic circuit associated with the outgoing line that accomodates the outgoing channel which will receive the byte. In accordance with logic internal to output organization 101, one of the random access memories in one set of memories is selected and the byte is written into a storage area of the selected memory dedicated to the outgoing channel as directed by the address word. During the next frame interval, the byte is read out into the outgoing channel.

Common to memory and logic circuits 110 are memory counter 112, line selector 113, flip-flop 114 and channel counter 115. Memory counter 112 comprises a ring counter having a count of N in each cycle. It is a function of memory counter 112 to select the one random access memory in the set that will store the byte concurrently on bus 106. The input to memory counter 112 constitutes the time slot clock source $C_t$. Memory counter 112 selects a different one of the N memories in each set for each successive one of the time slots on byte bus 106. The output of memory counter 112 sequentially energizes leads P(1) through P(N), which leads are applied in parallel to memory and logic circuits 110(1) through 110(P).

Line selector 113 functions to define the outgoing line to which the byte on byte bus 106 is destined. The control of line selector 113 is exercised by the address word on address bus 107 and, more specifically, it is controlled by leads 6 through M on address bus 107.

It is recalled that each input line and each corresponding output line has thereon twenty-four channels and it is further recalled that there are P output lines. The designation of the 24 outgoing channels on any line can be provided by five bits. These five bits constitute the first five bits of the address word and are carried by leads 1 through 5 on address bus 107. The leads 1 through 5 are branched from address bus 107 onto bus 107(1) and applied in parallel to memory and logic circuits 110(1) through 110(P). The address word portion on leads 1 through 5 of address bus 107 (now identified as bus 107(1)) function to identify the area in the random access memory dedicated to the outgoing channel, which area will store the byte on byte bus 106.

The remaining leads of address bus 107; namely, leads 6 through M, are branched onto bus 107(2) and bus 107(2) extends to selector 113. Leads 6 to M are sufficient in number to provide permutations of bits to designate all of the P outgoing lines. Line selector 113 is therefore a selector circuit which provides an output of one of P output leads T(1) through T(P) in accordance with the signal permutation on leads 6 through M of bus 107(2), the energized one of output leads T(1) to T(P) designating the outgoing line. Leads T(1) through T(P) extend to individual ones of memory and logic circuits 110(1) through 110(P), respectively.

The byte intervals of the 24 channels on each of output lines OT(1) through OT(P) are successively identified by channel counter 115. Channel counter 115 has the capability of counting up to the count of 24. The output of channel counter 115 constitutes leads S(1) through S(5) and the signal permutations on the leads define 24 different sets of permutations and therefore define the 24 channels on each output line. The input to channel counter 115 is provided by byte clock $C_b$. The output count of channel counter 115 is advanced by transitions of the byte clock wave, such as transition 701 in the timing wave of the byte clock in FIG. 7. Accordingly, the output of channel counter 115 designates an outgoing channel on each outgoing line and this designation is maintained on output leads S(1) to S(5) for a byte interval. For reasons described in detail hereinafter, the designation of each channel preferably occurs during the byte interval assigned to the immediately preceding outgoing channel. Output leads S(1) to S(5) extend in parallel to memory and logic circuits 110(1) through 110(P) to provide the address of the channel assigned to the next subsequent byte interval. Thereafter, during this next byte interval, any byte, stored in a memory set in the storage area dedicated to the channel, is read out to the outgoing line.

Another output of channel counter 115 constitutes lead $C_f$. Channel counter 115 is arranged to drive lead $C_f$ after the count of 24 is achieved. Lead $C_f$ is thus energized at the end of each frame and the energization triggers flip-flop 114, switching the flip-flop to the opposite state. The output of flip-flop 114 constitutes leads $W_A$ and $W_B$. It is apparent that leads $W_A$ and $W_B$ have applied thereto inverse conditions wherein one is high for one 24 byte interval line frame and the other is high for the other line frame. The function of signal waves on leads $W_A$ and $W_B$ is to alternately select each of the two sets of memories in each of memory and logic circuits 110(1) through 110(P) to write in the data from byte bus 106 for each line frame while the other set of memories reads out data stored therein to output lines OT(1) through OT(P). Leads $W_A$ and $W_B$ extend in parallel to memory and logic circuits 110(1) through 110(P).

Figures 2, 6:
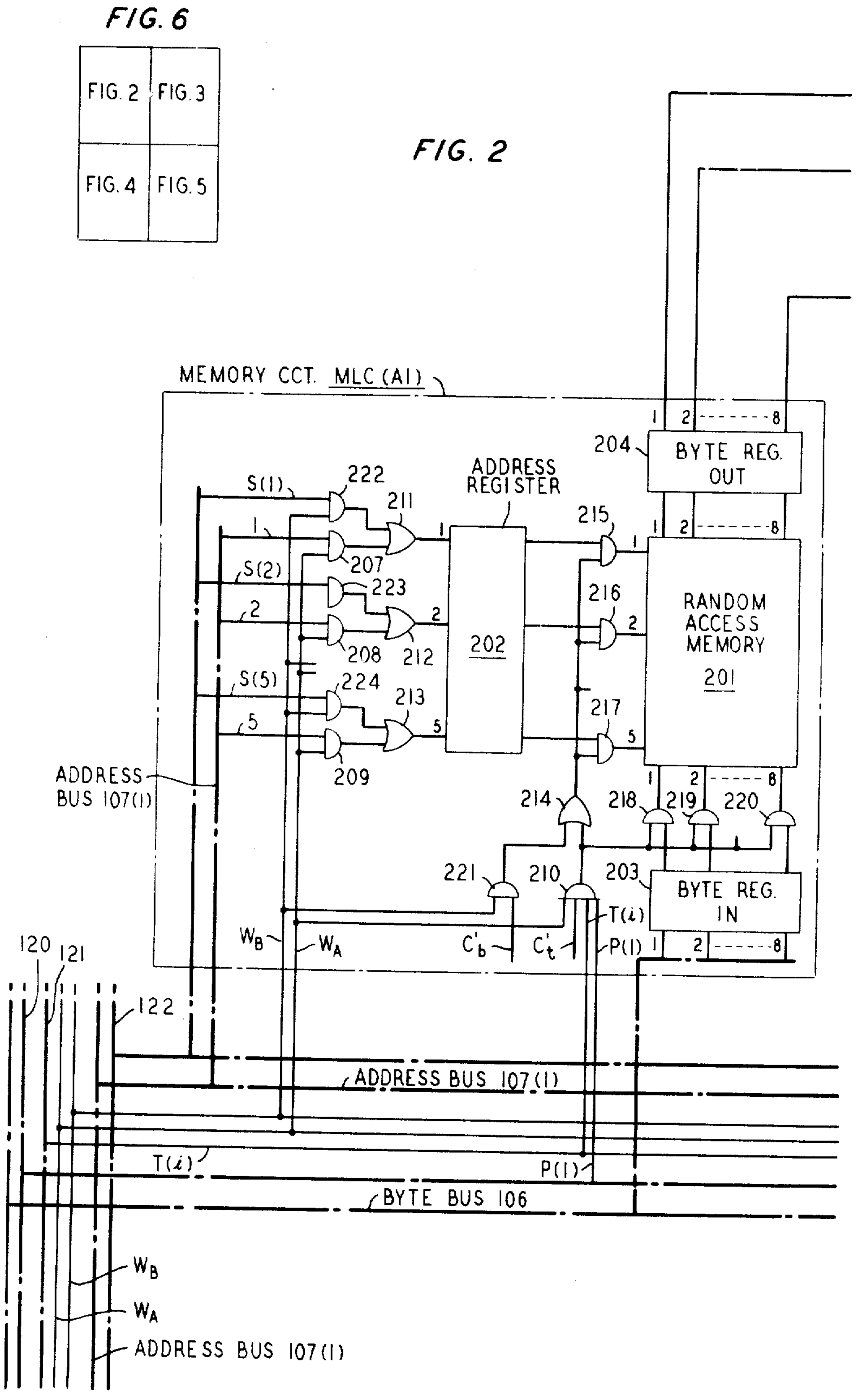
FIGS. 2 through 5, when arranged as shown in FIG. 6, disclose, in schematic form, the details of the two sets of memories associated with an outgoing path.
Figure 3:
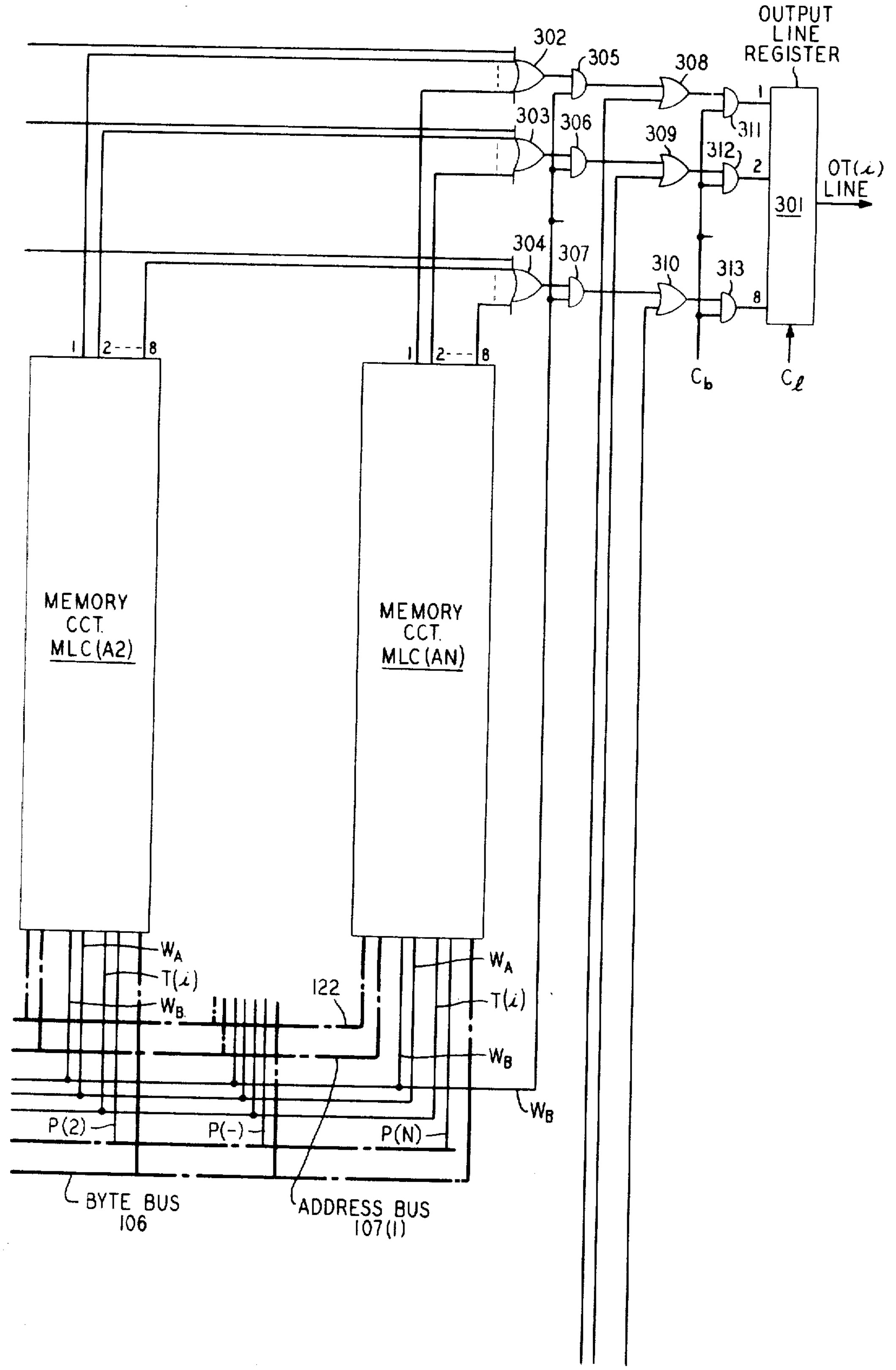

Each of memory and logic circuits 110 is arranged in substantially the same way. The details of one arrangement is shown in FIGS. 2 through 5 when arranged as shown in FIG. 6. It will be assumed that the memory and logic circuit disclosed in FIGS. 2 through 5 is an intermediate circuit which we may identify as circuit 110($i$). It will, therefore, be noted that the T lead that extends to the memory and logic circuit from cable 121 is identified in FIGS. 2 and 4 as lead T($i$) and that the outgoing line extending from the memory and logic circuit in FIG. 3 is identified as outgoing line OT($i$).

Figure 4:
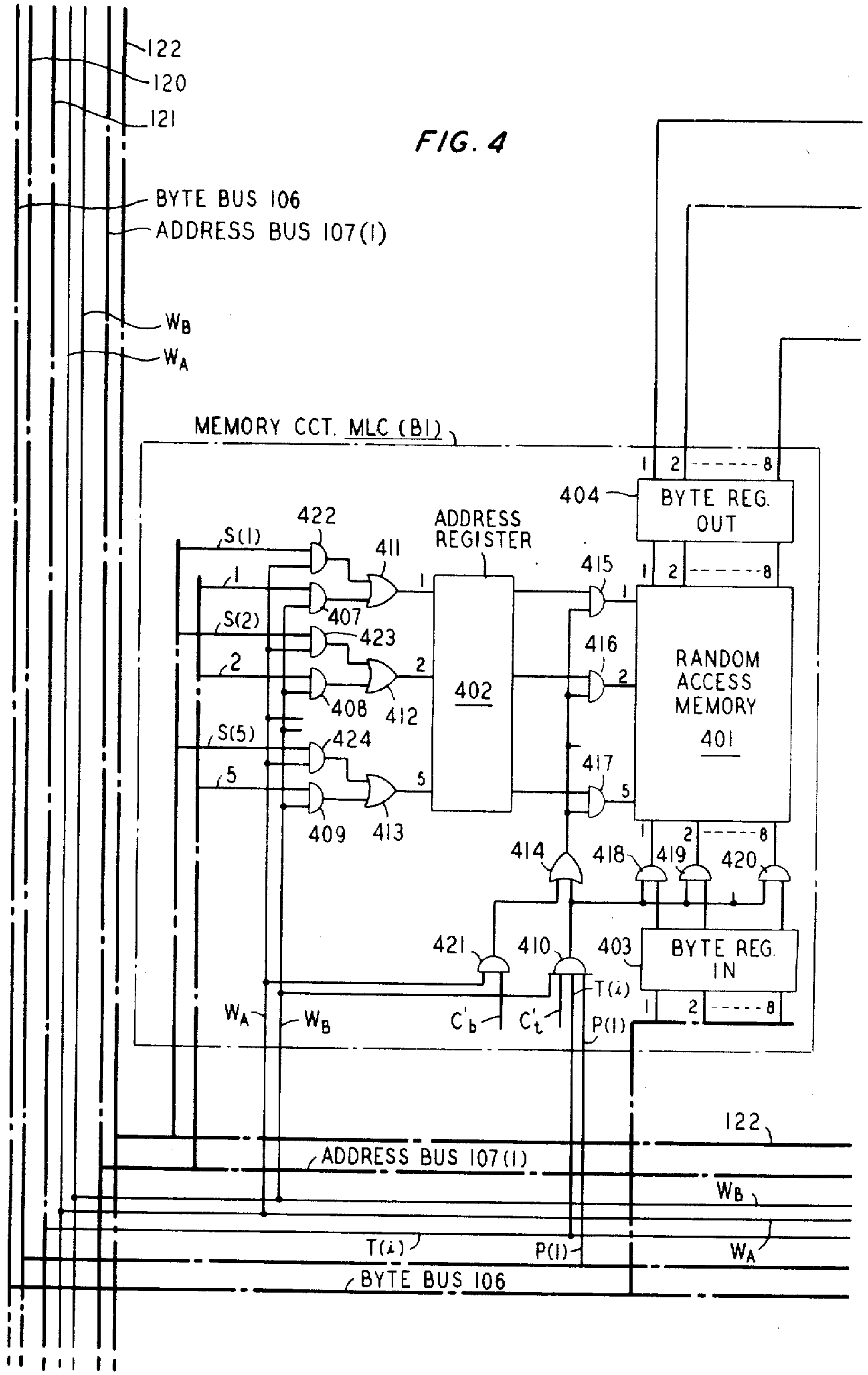
Figure 5:
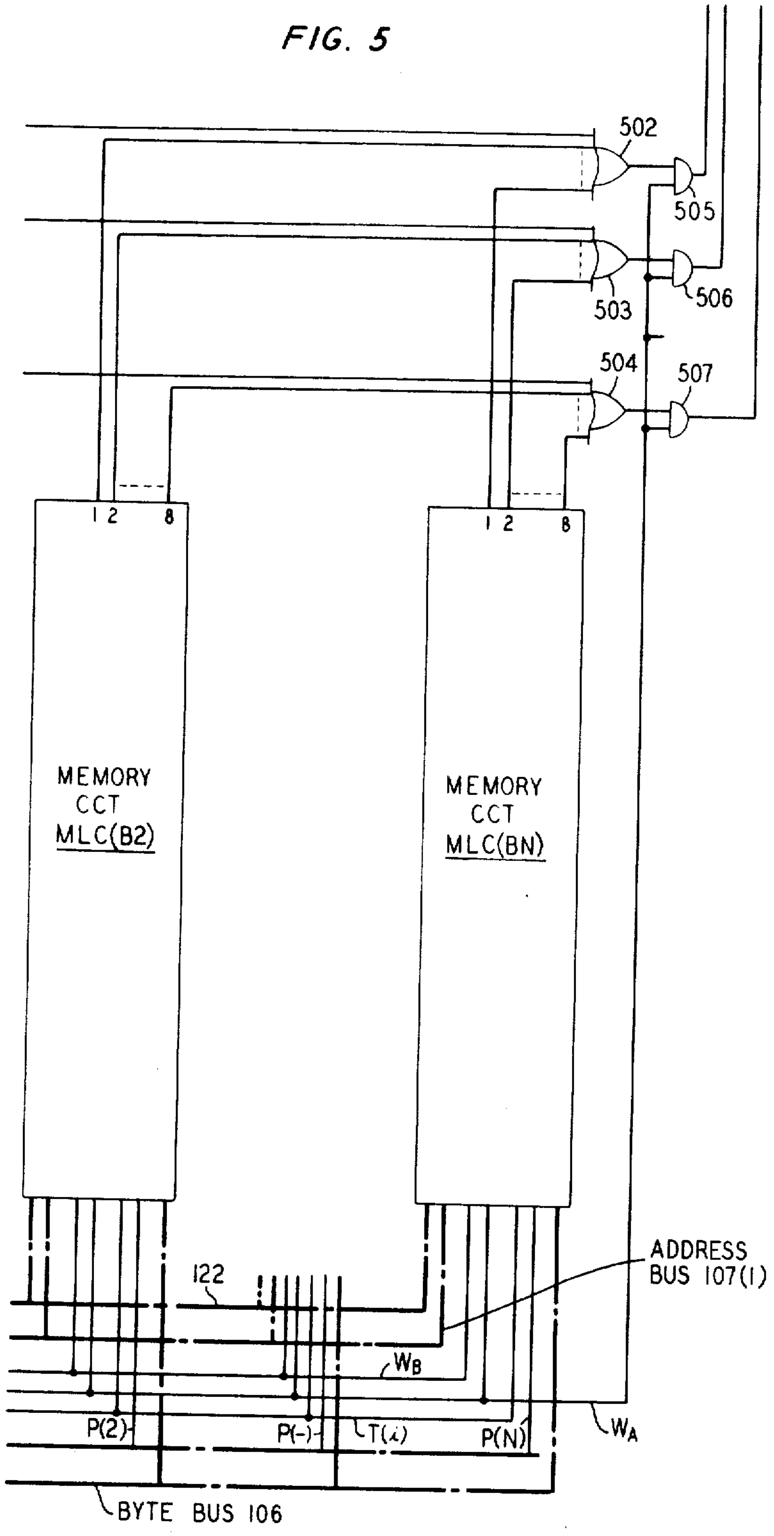

In general, the memory and logic circuit includes two sets of memory circuits, one set being identified by blocks MLC(A1) through MLC(AN), as seen in FIGS. 2 and 3, and the other set being identified as blocks MLC(B1) through MLC(BN), as seen in FIGS. 4 and 5. Common to the several memory circuits is output line register 301, FIG. 3, which register stores the bytes read out from the several memory circuits.

Each of the memory circuits is arranged in substantially the same way. Consider now memory circuit MLC(A1), shown in FIG. 2. Memory circuit MLC(A1) includes random access memory 201, address register 202, input byte register 203 and output byte register 204, together with associated gating circuitry. Each of the other memory circuits includes corresponding memories, address and byte registers, together with corresponding associated gating circuitry.

Random access memory 201 is arranged to store data bits in storage areas under the control and direction of address words. Specifically, random access memory 201 has a sufficient area for storing one byte for the several channels on output line OT($i$), and thus for storing the data in one line frame. We have presumed that each byte contains eight bits and further presumed that the output line accomodates 24 channels. Accordingly, random access memory 201 has sufficient storage area to store 24 bytes or 192 bits.

The arrangement of random access memory 201 is such that successive byte storage areas are dedicated to successive channels on output line OT($i$). The designation of each byte storage area can be provided by a five-bit address. The five leads extending to the left side of random access memory 201, as seen in FIG. 2, define the five-bit address word which designates each channel and which, therefore, designates the byte storage area dedicated to the channel. Write-in is accomplished by the application of an eight-bit byte to the eight leads on the bottom of random access memory 201 as seen in FIG. 2, together with the application of a five-bit address word, writing in the eight-bit byte into the byte storage area in memory 201 designated by the five-bit address word. Similarly, readout (which advantageously is destructive readout) is provided by the application of a five-bit address word to memory 201, resulting in the readout out of the eight-bit byte stored in the byte area designated by the five-bit address word to the right leads on the top of memory 201, as shown in FIG. 2.

The manner in which a byte is read from byte bus 106 into random access memory 201 will now be considered. In order for memory 201 in memory circuit MLC(A1) to be designated as the memory which is to accept the byte, several conditions have to be met. First, flip-flop 114 must be toggled to the SET condition. In this condition, output lead $W_A$ is high and this designates that the several memories in the set comprising memory circuits MLC(A1) through MLC(AN) are in the "write in" cycle. At the same time, it will be noted that the lead $W_B$ is in a low condition, the memories in the set comprising memory circuits MLC(B1) through MLC(BN) are in the "read out" cycle.

The next condition that must be met is that due to the advance of memory counter 112, the output lead P(1) is in the high condition. Lead P(1) extends through cable 120, as previously described, and the lead then emerges from the cable as seen in FIG. 2 and extends to memory circuit MLC(A1). The energization of the first P lead (P1) selects the first memory, namely random access memory 210 in memory circuit MLC(A1), of the set of memories in memory circuits MLC(A1) through MLC(AN). It is, of course, realized that when memory counter 112 advances to energize another P lead, the random access memory in the correspondingly numbered memory circuit will be designated to write in the byte to the exclusion of the other memories in the set.

Another condition is that the address word must designate line OT($i$) as the outgoing line for the byte. It is recalled that bits 6 through M of the address word designate line OT($i$) as the outgoing line for the byte. It is recalled that bits 6 through M of the address word designate the outgoing line. It is further recalled that leads 6 through M of address bus 107 extend by way of branch 107(2) to line selector 113. Line selector 113 energizes an output T lead corresponding to the designated outgoing line. In this case, output lead T($i$) corresponding to outgoing line OT($i$) is energized. Lead T($i$) extends through cable 121 and then from cable 121 in FIG. 2 to AND gate 210 in memory circuit MLC(A1).

Lead $W_A$ extends to AND gates 207 through 209 and to AND gate 210 in memory circuit MLC(A1). Since the condition on lead $W_A$ is high, these gates are enabled. The enabling of gates 207 through 209 passes the bits on the five leads of address bus branch 107(1) through OR gates 211 through 213 to address register 202. Consequently, address register 202 now contains the first five bits of the address word and, therefore, contains that portion of the address word which designates the outgoing channel on outgoing line OT($i$) to which the byte is directed. The five-bit address word similarly designates the byte storage portion of random access memory 201 which is dedicated to the outgoing channel.

We had previously noted that lead P(1) is in the high condition and this lead extends to AND gate 210. Leads $W_A$ and T($i$) are also energized, whereby AND gate 210 is enabled, passing therethrough clock pulses provided by lead $C_t'$. The output of AND gate 210 enables gates 218 through 220 and, in addition enables gates 215 through 217 by way of OR gate 214. The clock pulses on lead $C_t'$, are the inversion of clock pulses $C_t$ which provide the clocking signals to apply the byte from input organization 100 to byte bus 106. Gate 210 therefore enables these gates at the midpoint of the $C_t$ clock cycle or at the approximate midpoint of the interval that the byte is on byte bus 106.

We have previously noted that byte bus 106 extends in parallel to all of the memory and logic circuits. As seen in FIG. 2, the eight parallel leads of byte bus 106 extend to byte register 203. Byte register 203 therefore stores the byte presently on byte bus 106.

The eight-lead output of byte register 203 is connected to gates 218 through 220. These gates are enabled by AND gate 210. Consequently, the eight bits of the byte in register 203 are applied by way of gates 218 through 220 to random access memory 201. At the same time, the five-bit portion of the address word designating the output channel (and thus designating the byte storage area of the channel) is read out from address register 202 through AND gates 215 through 217 to random access memory 201. Consequently, random access memory 210 stores the byte in that byte storage portion dedicated to the outgoing channel.

The next clock pulse $C_t$ advances memory counter 112 to energize output lead P(2), FIG. 3. The condition on lead P(1) goes down and gate 210 becomes disabled. At the same time, the high condition on lead P(2) enables an AND gate in memory circuit MLC(A2) corresponding to gate 210. If the byte in the next time slot on byte bus 106 is to be passed to output line OT($i$), this byte will be stored in the random access memory in memory circuit MLC(A2) in the same manner that the previous byte was stored in memory 201. Similarly, during each successive time slot, successive ones of the memory circuits are enabled to accept bytes in the event that they are destined for output line OT($i$), with memory circuit MLC(A1) being designated in the time slot following the designation of memory circuit MLC(AN). In this manner if a memory stores a byte, the next byte stored therein cannot be within an interval of time less than the N time slots.

At the termination of the line frame, flip-flop 114 is toggled, setting it to the opposite state wherein the condition on lead $W_A$ goes low and the condition on lead $W_B$ goes high. As a result, as described hereinafter, the B set of memory circuits; namely, memory circuits MLC(B1) through MLC(BN), shown in FIGS. 4 and 5, write in the bytes while the A set of memory circuits; namely, memory circuits MLC(A1) through MLC(AN), read out the bytes.

With the condition on lead $W_B$ high, AND gates 407 through 409 in memory circuit MLC(B1) are enabled, passing the first five bits of the address word on address bus 107(1) through OR gates 411 through 413 to address register 402. Address register 402, therefore, operates in substantially the same manner as address register 202 to store the channel designation. At the same time, byte register 403 stores the byte on byte bus 106. If the byte is directed to output line OT($i$) and memory counter 112 is designating the first memory circuit, leads T($i$) and P(1) are in the high condition and AND gate 410 is, therefore, enabled. This passes the $C_t'$ clock pulse therethrough to enable AND gates 418 through 420 and to enable AND gates 415 through 417 by way of OR gate 414. As a consequence, the byte in byte register 403 is directed to the byte storage area dedicated to the outgoing channel in random access memory 401 by the five-bit portion of the address word in address register 402. It is, therefore, seen that the A and the B sets of memory circuits alternately store the bytes on byte bus 106 during alternate line frames.

It is recalled that during this line frame the condition on lead $W_B$ is high. In memory circuit MLC(A1) this high condition enables AND gates 222 through 224 and enables AND gate 221. The enabling of AND gates 222 through 224 gates therethrough the channel work identification generated by channel counter 115. It is recalled that channel counter 115 generates the channel word identification one interval prior to the byte interval of this identified outgoing channel. This channel word identification is applied to leads S(1) through S(5), in parallel, and then by way of cable 122 and through enabled gates 222 through 224 and OR gates 211 through 213 to address register 202.

With AND gate 221 enabled, clock pulse $C_b'$ is passed therethrough. Clock pulse $C_b'$ comprises the inverse of byte clock $C_b$. With AND gate 221 enabled, clock pulse $C_b'$ is passed through the gate and through OR gate 214 to enable AND gates 215 through 217. The channel identification word on address register 202 is, therefore, passed through these enabled AND gates to random access memory 210. As a consequence, the byte, if any, stored in the byte storage area dedicated to the output channel designated by the channel identification word is read out to byte register 204, this readout preferably being a destructive readout of random access memory 201. It is to be noted that the readout function performed in memory circuit MLC(A1) is also being concurrently performed in each of memory circuits MLC(A2) through MLC(AN). It is also recalled that during the previous line frame a byte destined for the outgoing channel has been stored in one of the memory circuits, the character of the system being such that one byte for each outgoing channel is provided for each line frame. Accordingly, one and only one of the memory circuits is storing a byte for the outgoing line channel. As a consequence, one and only one byte register, such as byte register 204 in the several memory circuits associated with outgoing line OT($i$), is preferably storing a byte, the other byte registers storing zeroes. This byte is provided to the eight output leads of the byte register, such as byte register 204, and is applied through OR gates 302 through 304, FIG. 3, to AND gates 305 through 307. With lead $W_B$ in the high condition, these latter AND gates are enabled and the byte is further passed through OR gates 308 through 310 to AND gates 311 through 313.

Figure 7:
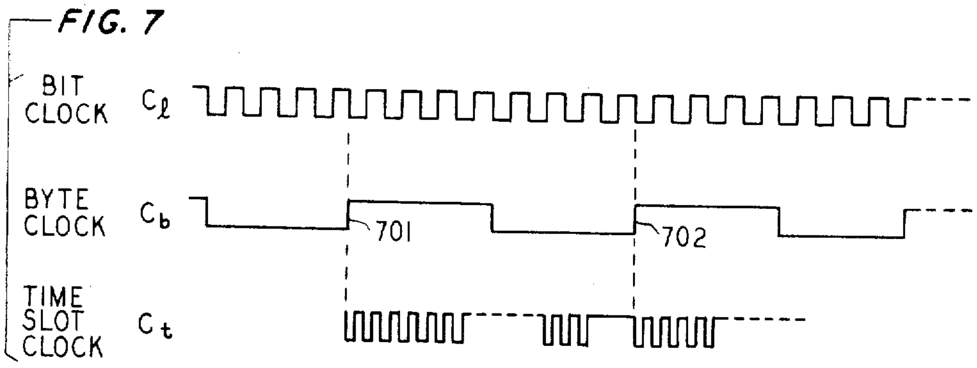
FIG. 7 discloses the waveforms of various clock signals that control the timings of the circuitry in the time-division multiplex data transmission system.

As the initial portion of the byte interval of the outgoing channel, byte clock $C_b$ goes to the high condition (as depicted by transition 701, for example, in FIG. 7). It has been pointed out that the byte was stored in the byte register (such as byte register 204) prior to the channel's byte interval. The byte, still being stored by the byte register, and therefore still being applied through OR gates 308 through 310, is thereupon further passed, in parallel, through AND gates 311 through 313 into output line shift register 301. Bit clock pulse $C_1$, whose timing waves are shown in FIG. 7, then serially shifts the bits of the byte out to outgoing line OT($i$).

Channel counter 115 has now been advanced by byte clock $C_b$ to designate the next successive outgoing channel and this designation is now written into address register 202. Upon th next transition of byte clock $C_b$, the inverse clock pulse, namely $C_b'$ is passed through gate 221 and the corresponding gates in memory circuits MLC(A2) through MLC(AN). Accordingly, as previously described, the byte designated for the next channel is read out of the various random access memories, including random access memory 201, into the outgoing type registers, including byte register 204. The next positive transition of byte clock $C_b$ then passes this next byte into output line register 301. In this manner the bytes of all the outgoing channels are passed to register 301 and then fed to outgoing line OT($i$). Substantially identical functions are also concurrently being performed for each of the other outgoing lines.

At the termination of the line frame, flip-flop 114 is again toggled, lead $W_A$ goes high, and lead $W_B$ goes low. Memory circuits MLC(A1) through MLC(AN)

again write in the bytes when the outgoing line is designated by the address word. With lead $W_4$ high, AND gates 421 through 424 in memory circuit MLC(B1) are enabled. Corresponding gates in memory circuits MLC(B2) through MLC(BN) are also enabled. Accordingly, during the line frame, the successive channel identity words generated by channel counter 115 are passed into address register 402 and the byte storage area dedicated to the outgoing channel designated by this address word is read out into byte register 404. Concurrently, the byte storage portion dedicated to the outgoing channel in the memories in memory circuits MLC(B2) through MLC(BN) are read out. Since, as described above, one of the memories stores the byte, the byte is then passed through the output of the corresponding outgoing register through OR gates 502 through 504 (FIG. 5) to AND gates 505 through 507. These latter AND gates are presently enabled by the high condition on lead $W_4$ and the byte is thus passed, in parallel, through OR gates 308 through 310 to AND gates 311 through 313. As previously described, the condition of the byte clock $C_b$ goes high at the initial portion of the byte interval of the outgoing channel. This, therefore, enables AND gates 311 through 313 to pass the byte into output line shift register 301 and the bits of the byte are serially clocked out to output line OT($i$) by clock pulse $C_1$. Thus, while memory circuits MLC(A1) through MLC(AN) write in the bytes on byte bus 106, memory circuits MLC(B1) through MLC(BN) read out the bytes stored therein to output line register 301, which bytes are then shifted onto output line OT($i$). The memory and logic circuits associated with each of the other outgoing lines are concurrently operating in the same manner as memory and logic circuit 110($i$).

Although a specific embodiment of this invention has been shown and described, it will be understood that various modifications may be made without departing from the spirit of this invention.

We claim:

1. In a time-division system wherein data signals are successively assembled into time slots during each one of a sequence of time frames, a storage system comprising:

- a plurality of stores, each of the stores having portions for storing data signals, each portion in each store individually dedicated to each of the time slots of the time frame and grouped with corresponding portions in other stores dedicated to the same time slot;
- means effective during one of the time frames for writing the assembled data signals into one of the portions of the groups dedicated to the time slot; and
- means operative during the next sequential time frame for simultaneously reading the contents of all of the portions of the group dedicated to the time slot.

2. In a time-division system, in accordance with claim 1, wherein the writing means includes means for writing successive ones of the assembled data signals into different ones of the stores.

3. In a time-division system in accordance with claim 2 wherein the means for writing includes sequencing means for defining successive ones of the stores to store successive ones of the assembled data signals.

4. In a time-division system in accordance with claim 3 and further including a source of address signals, each of the address signals accompanying each of the assembled data signals and designating all of the portions dedicated to one of the time slots and wherein the means for writing includes means responsive to each of the address signals for identifying the designated portions, and means responsive to the defining of one of the successive stores and the identification of the designated portions for selecting the portion in the defined store dedicated to the time slot.

5. A time-division system for interconnecting a plurality of incoming data channels on each of a plurality of incoming lines with a plurality of outgoing data channels on each of a plurality of outgoing lines, said system comprising:

- means for assembling data signals from all of the incoming channels during each one of a sequence of time frames;
- a group of stores associated with each of the outgoing lines, each of the stores in any one of the groups having storage areas individually dedicated to each of the outgoing channels on the associated outgoing line and individually arranged to store a data signal destined for the outgoing channel;
- means for writing the data signals assembled during one of the time frames and destined for the outgoing channels on any one of the outgoing lines into one of the stores of the group associated with the outgoing line, each of the data signals being written into a selected one of the areas in one of the stores; and
- means for distributing the data signals written into the group of stores to each of the outgoing channels on the associated outgoing line during the next sequential one of the time frames, the distributing means including means for simultaneously reading out all of the areas in the group of stores dedicated to the outgoing channel.

6. A time-division system in accordance with claim 5 and further including a second group of stores associated with each of the outgoing lines, each of the stores in any one of the second group having storage areas individually dedicated to each of the outgoing channels on the associated outgoing line and individually arranged to store data signals destined for the outgoing channel and means for writing the data signals assembled during the next sequential time frame into selected areas in the further group of stores.

7. A time-division system in accordance with claim 5 wherein the means for writing includes sequencing means for defining successive ones of the stores in the group to store successive ones of the assembled data signals.

8. A time-division system in accordance with claim 7 and further including a source of address signals, each of the address signals accompanying each of the assembled data signals and designating one of the outgoing channels and wherein the means for writing includes means responsive to each of the address signals for identifying the areas dedicated to the designated outgoing channel, and means responsive to the defining of the store in the group and the identification of the dedicated areas for selecting the one area that the data signal is written into.

* * * * *